(12) United States Patent
Bigman

(10) Patent No.: US 9,952,771 B1
(45) Date of Patent: Apr. 24, 2018

(54) METHOD AND SYSTEM FOR CHOOSING AN OPTIMAL COMPRESSION ALGORITHM

(71) Applicant: EMC Corporation, Hopkinton, MA (US)

(72) Inventor: Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/086,565

(22) Filed: Mar. 31, 2016

(51) Int. Cl.
  *G06F 12/00* (2006.01)
  *G06F 13/00* (2006.01)
  *G06F 13/28* (2006.01)
  *G06F 3/06* (2006.01)

(52) U.S. Cl.
  CPC .......... *G06F 3/0608* (2013.01); *G06F 3/0661* (2013.01); *G06F 3/0679* (2013.01)

(58) Field of Classification Search
  CPC ........ G06F 3/06; G06F 3/0601; G06F 3/0602; G06F 3/0608; G06F 3/0641; G06F 3/0655–3/0661; G06F 3/0668; G06F 3/0671; G06F 3/0673; G06F 3/0674; G06F 3/0676; G06F 3/0677; G06F 3/0679; G06F 3/068; G06F 3/0682; G06F 3/0683; G06F 3/0685; G06F 3/0688; G06F 12/00; G06F 2003/0691; G06F 2003/0692; G06F 2003/0694; G06F 2003/0695; G06F 2003/0697; G06F 2003/0698; G06F 2211/00–2211/902; G06F 2212/00–2212/7211; G11C 16/06; G11C 2207/102
  See application file for complete search history.

(56) References Cited

U.S. PATENT DOCUMENTS

| | | | | |
|---|---|---|---|---|
| 5,045,852 A | * | 9/1991 | Mitchell | H03M 7/48 341/51 |
| 6,175,856 B1 | * | 1/2001 | Riddle | H04N 7/148 348/E7.082 |
| 6,754,221 B1 | * | 6/2004 | Whitcher | H04L 47/10 370/401 |
| 7,420,992 B1 | * | 9/2008 | Fang | H04L 12/4633 370/477 |
| 9,489,837 B1 | * | 11/2016 | ElHilali | H04Q 9/00 |
| 9,503,123 B1 | * | 11/2016 | Pinho | H03M 7/425 |
| 9,660,666 B1 | * | 5/2017 | Ciarlini | H03M 7/30 |
| 2005/0249008 A1 | * | 11/2005 | Hsieh | G06F 3/0608 365/189.011 |
| 2006/0123035 A1 | * | 6/2006 | Ivie | G06F 17/30595 |
| 2012/0284587 A1 | * | 11/2012 | Yu | G06F 3/0608 714/773 |
| 2014/0207745 A1 | * | 7/2014 | Groseclose | G06F 3/0608 707/693 |

* cited by examiner

*Primary Examiner* — Daniel C Chappell

(57) ABSTRACT

Example embodiments of the present invention relate to a method, a system, and a computer program product for compressing data in a data storage system. The method includes performing writes to the data storage system according to a first compression algorithm and determining to perform write commands according to a second compression algorithm. Subsequent writes may be performed to the data storage system according to the second compression algorithm.

19 Claims, 8 Drawing Sheets

(TEST COMP. ALGS.)

FIG. 1 (WRITE W/ 2ND COMP. ALG.)

FIG. 2 (TEST COMP. ALGS.)

FIG. 3 (CLEANUP)

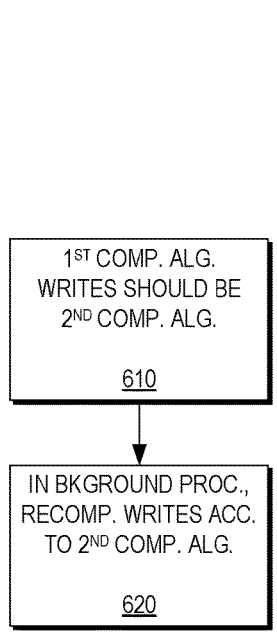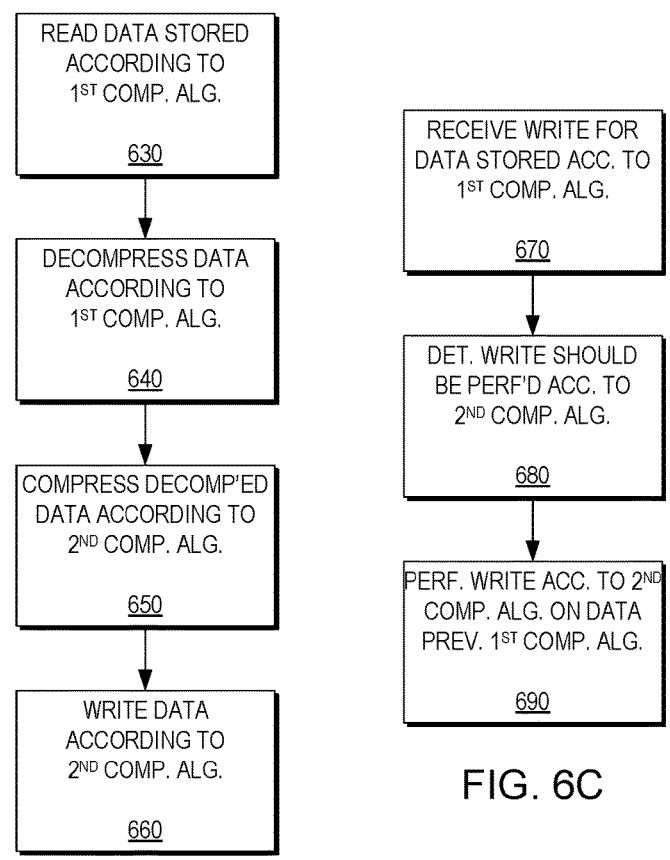

even though not every element may be labeled in every figure.

METHOD AND SYSTEM FOR CHOOSING AN OPTIMAL COMPRESSION ALGORITHM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. No. 14/976,532 entitled "STORAGE ARRAY COMPRESSION BASED ON THE STRUCTURE OF THE DATA BEING COMPRESSED" filed on Dec. 21, 2015 the teachings of which applications are hereby incorporated herein by reference in their entirety.

TECHNICAL FIELD

This application relates to data storage and, more particularly, to choosing an optimal compression algorithm.

BACKGROUND

There are many types of storage disks. For example, there are flash disks, ATA (Advanced Technology Attachment or AT Attachment) disks and SATA (serial ATA) disks. When comparing the disks, the flash disks are more expensive but provide faster data retrieval (e.g., 1 million I/Os (input/output requests) per second) than ATA disks while the ATA disks are more expensive but provide faster data retrieval than the SATA disks (e.g., 100 per second). One way to be able to use less flash disks is to compress the data stored on a flash disk.

SUMMARY

Example embodiments of the present invention relate to a method, a system, and a computer program product for compressing data in a data storage system. The method includes performing writes to the data storage system according to a first compression algorithm and determining to transition to a second compression algorithm. Subsequent writes may be performed to the data storage system according to the second compression algorithm.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 6A-6C are flow diagrams illustrating methods for recompressing data in the system of FIG. 1 according to respective example embodiments of the present invention;

DETAILED DESCRIPTION

In traditional data storage systems there are many compression algorithms having various behaviors, advantages, and disadvantages. Typically, data storage systems employ only one particular compression algorithm which may lead to suboptimal results (e.g., compute time and compression ratio) if the compression algorithm is not well suited to the operational parameters of the data storage system. Accordingly, choosing a compression algorithm is a very important task as different compression algorithms may be better suited for different applications in the data storage system.

Example embodiments of the present invention overcome these and other challenges of compression in traditional data storage systems by enabling transitioning between compression algorithms in a data storage systems (e.g., per logical devices/storage groups, or a mapping to a single application).

Figure 1:
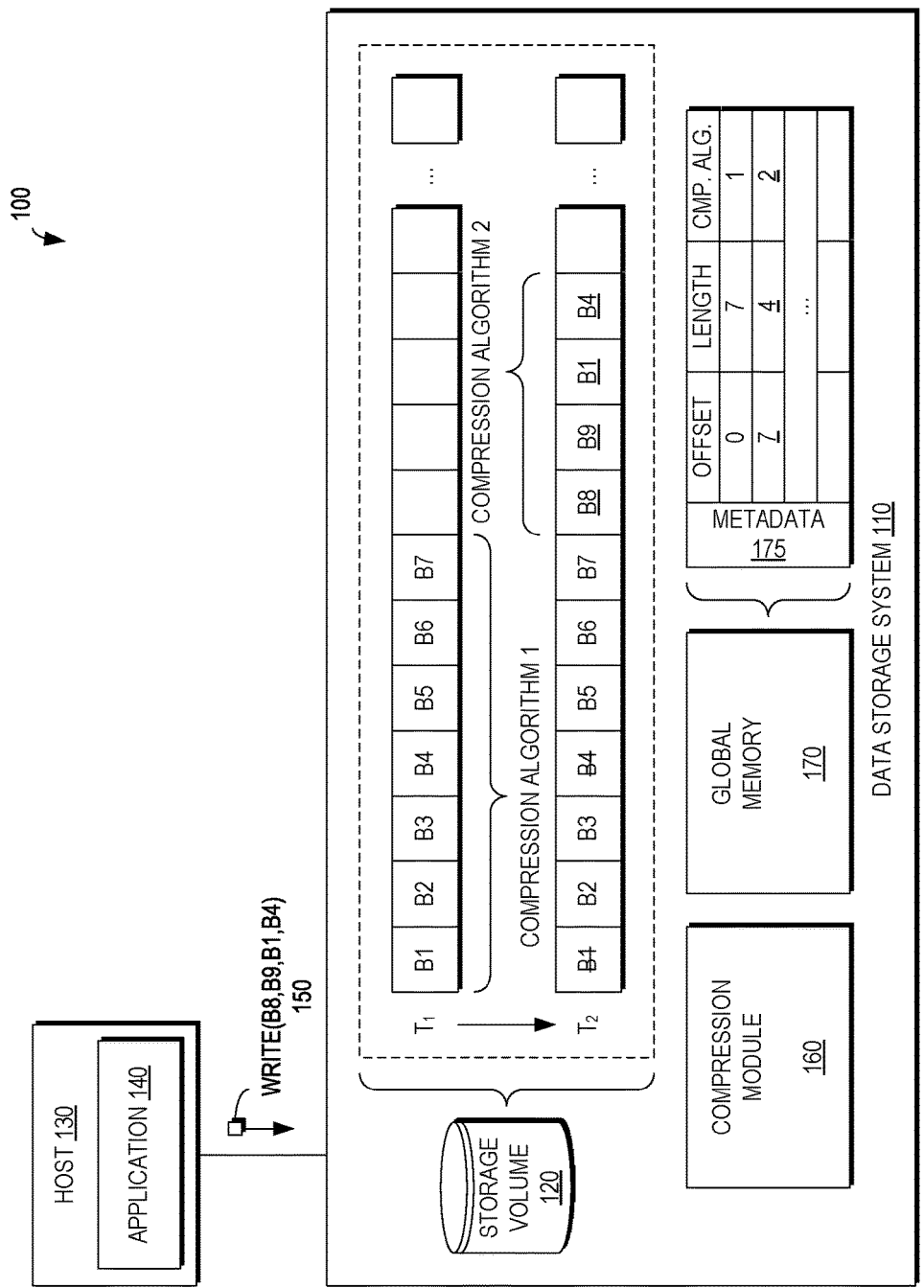
FIG. 1 is a block diagram illustrating a system for storing data according to respective compression algorithms according to an example embodiment of the present invention.
Figure 4:
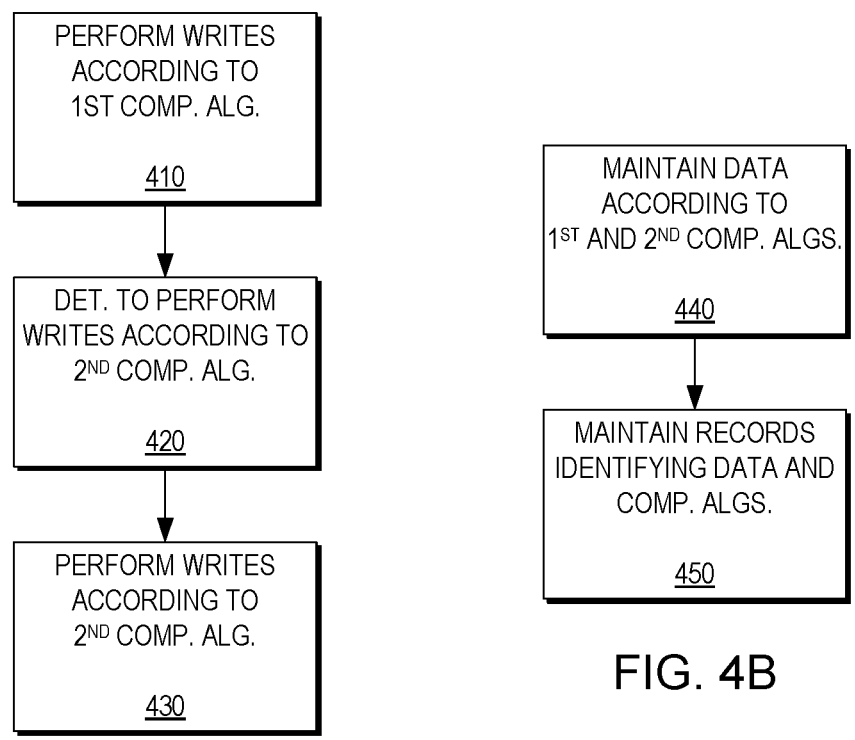
FIGS. 4A-4B are flow diagrams illustrating methods for storing data according to respective compression algorithms according to respective example embodiments of the present invention.

FIG. 1 is a block diagram illustrating a system 100 for storing data according to respective compression algorithms according to an example embodiment of the present invention. FIGS. 4A-4B are flow diagrams illustrating methods for storing data according to respective compression algorithms according to respective example embodiments of the present invention. FIGS. 1 and 4A-4B may be described in conjunction.

As illustrated in FIGS. 1 and 4A, a data storage system 110 may include a storage volume 120, a compression module 160, and global memory 170 storing, for example, metadata. In certain embodiments, the compression module 160 may compress data to be stored in the storage volume 120 according to a compression algorithm selected from a plurality of compression algorithms. The data storage system 110 may perform write commands according to a first compression algorithm (410). For example, at a first time $T_1$, the data storage system 110 may store seven extents B1, B2, B3, B4, B5, B6, and B7 according to the first compression algorithm. In certain embodiments, these extents may comprise of one or more blocks depending on their initial size and the compression algorithm.

At a second time $T_2$, as will be described in greater detail below, the data storage system 110 may determine to perform write commands 150 according to a second compression algorithm (420). Thus, any subsequently received write commands 150 (e.g., new writes or rewrites), for example from an application 140 on a host 130, received by the data storage system 110 will be performed according to the second compression algorithm (430) with the data block being written to a new location using the second compression algorithm. For example, one or more write commands writing to extents B8, B9, B1, and B4 will be stored in the data storage system according to the second compression algorithm.

In certain example embodiments, the data storage system 110 may be a flash storage array. In other example embodiments, the data storage system 110 may be a scalable data storage system using content addressing such as EMC® XtremIO® all flash arrays by EMC Corporation of Hopkinton, Mass. In one example, the data storage system 110 may include one or more of the features of a device for scalable data storage and retrieval using content addressing described in U.S. Pat. No. 9,104,326 entitled "SCALABLE BLOCK DATA STORAGE USING CONTENT ADDRESSING" commonly assigned with the present application to EMC Corporation of Hopkinton, Mass., the teachings of which are incorporated herein in their entirety.

In certain embodiments, the write command is treated as a new write and data is stored sequentially regardless of whether the data is being written to a new address or is a new value being written to an existing address. Therefore, as illustrated in FIG. 1, processing the received write command results in extents B8 and B9 being written sequentially to the storage volume 120 after the preexisting extents B1-B7 and extents B1 and B4 being written sequentially after extents B8 and B9 as updates to replace the previous extents B1 and B4. It should be understood that, because extents B1 and B4 are written to a new location, they will be written with the second compression algorithm and their size may change (not shown).

Now, at time $T_2$, extents B2, B3, B5, B6, and B7 are stored according to the first compression algorithm and extents B8, B9, B1, and B4 are stored according to the second compression algorithm. As will be described in greater detail below, in time (and given that some writes may be performed automatically to reduce the number of free spaces), most or all data may be transitioned to the second compression algorithm (assuming the data storage system 110 does not transition to yet a third compression algorithm. Therefore, as illustrated in FIG. 1, updates will not break existing ranges but rather will join to the same range.

Accordingly, at time $T_2$, data is stored in the data storage system 110 according to the first compression algorithm and the second compression algorithm (i.e., the data compressed by the compression module 160 at time $T_1$ according to the first compression algorithm and stored in extents B1, B2, B3, B4 B5, B6, and B7, and the data compressed by the compression module 160 at time $T_2$ according to the second compression algorithm and stored in a new location in extents B8, B9, B1, and B4). In other words, the data storage system stores data contemporaneously according to the first compression algorithm and the second compression algorithm. However, in order to keep track of which data is stored according to which compression algorithm, metadata 175 is retained in global memory 170 in example embodiments of the present invention. In example data storage systems 110 comprising a plurality of storage controllers (not shown) each having a respective global memory 170, the global memory 170 for the data storage system 110 may span the local global memory 170 respective to each storage controller.

The metadata may identify data stored according to the first compression algorithm and data stored according to the second compression algorithm. In certain embodiments, the data storage system 110 may maintain metadata in each data block identifying its respective compression algorithm, which would allow the data storage system 110 to change the used algorithm. Therefore, as illustrated in FIG. 1, extents B2, B3, B5, B6, and B7 would include metadata identifying the first compression algorithm and extents B8, B9, B1, and B4 would include metadata identifying the second compression algorithm. Accordingly, in such embodiments, global memory 170 is not needed to store metadata 175 (thereby simplifying coordination between a plurality of data storage system nodes) because the compression algorithm information is stored with each data block in the storage volume 120. Though a viable approach, this approach suffer from the need to write a metadata for every block (i.e., in dataset having a 0% compression ratio, even though the block remains exactly the same size, the data storage system 110 would need two blocks to keep the data).

A different approach would be to keep in memory the chosen compression algorithm. However, if example embodiments of the present invention retain compression algorithm identification information for every new block (including updated blocks), a large amount of memory would be needed (e.g., in a data storage system having four compression algorithms, an additional 2 bytes would be requires for each block)

In other embodiments, example embodiments of the present invention store the compression algorithm identification metadata in memory in an efficient way. Some embodiment assume that very few changes in compression algorithm will occur over time. Accordingly, example embodiments of the present invention store in metadata 175 ranges of data and their associated compression algorithm. As illustrated in FIG. 1, the global memory 170 may store metadata 175 including a table of storage volume offsets, lengths, and compression algorithms. Thus, as illustrated in FIG. 1, at time $T_1$, blocks starting at offset 0 for a length of 7 are associated with the first compression algorithm; at time $T_2$, blocks starting at offset 0 for a length of 7 remain associated with the first compression algorithm (even though data for blocks B1 and B4 have been updated), and blocks starting at offset 7 for a length of 4 are associated with the second compression algorithm. It should be understood that, in certain embodiments, different compression algorithms may be used for respective storage groups (i.e., volumes or sets of volumes), data sets, or applications.

Figure 2:
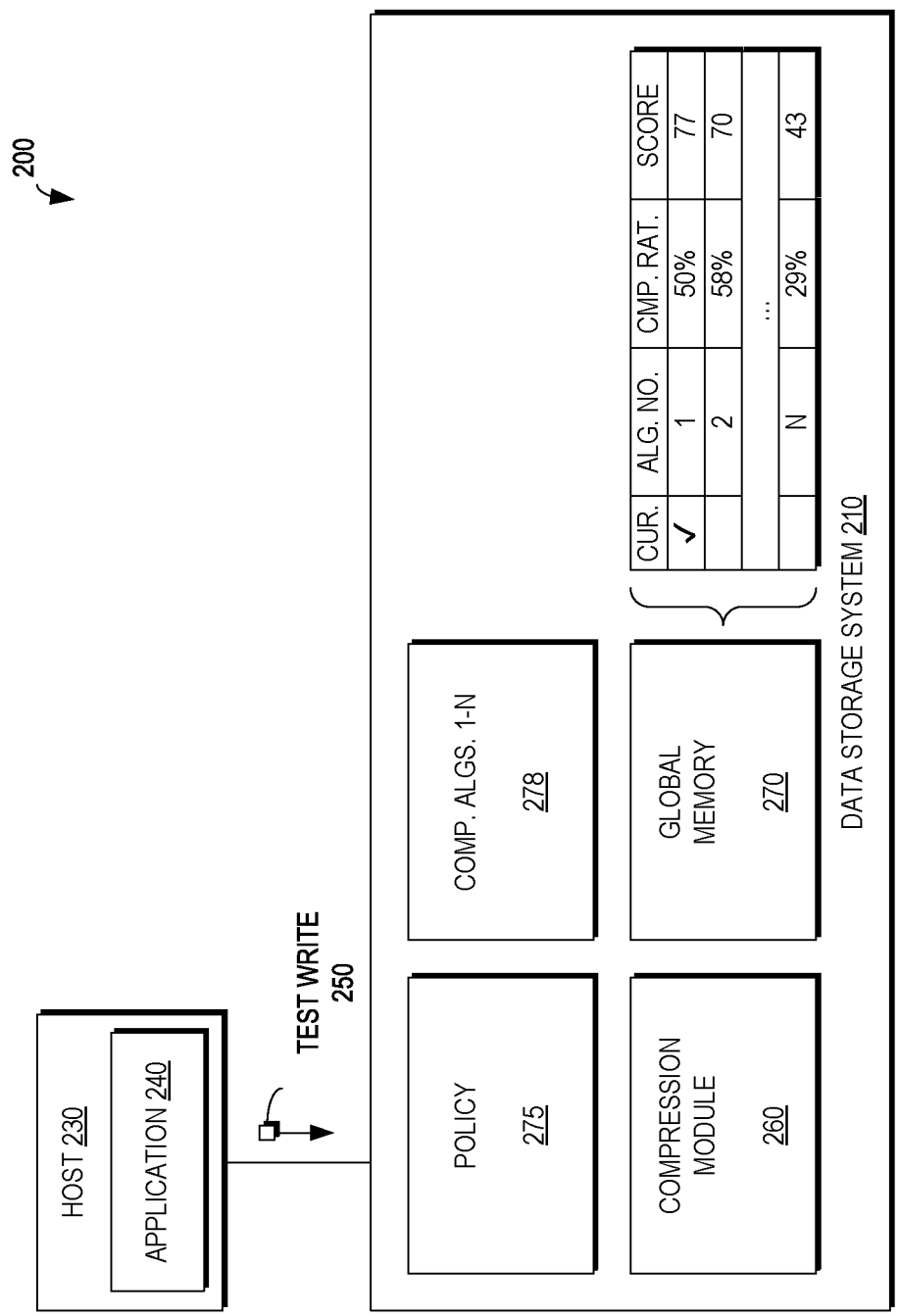
FIG. 2 is a block diagram illustrating testing a plurality of compression algorithms in the system of FIG. 1 according to an example embodiment of the present invention.
Figure 5:
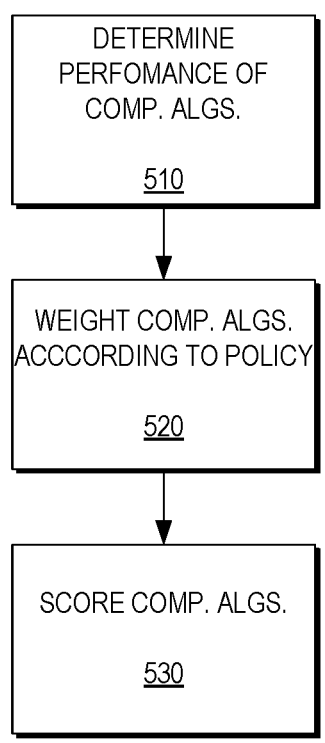
FIG. 5 is a flow diagram illustrating a method for selecting a compression algorithm according to an example embodiment of the present invention.

FIG. 2 is a block diagram illustrating testing a plurality of compression algorithms in the system of FIG. 1 according to an example embodiment of the present invention. FIG. 5 is a flow diagram illustrating a method for selecting a compression algorithm according to an example embodiment of the present invention. FIGS. 2 and 5 may be described in conjunction.

As illustrated in FIG. 2, the data storage system 210 may include a compression module 260 and global memory 270. Additionally, the data storage system 210 may include a policy 275 for determining an optimal compression algorithm and a plurality of compression algorithms 1-N 278. As will be described in greater detail below, example embodiments of the present invention may test the performance of the plurality of compression algorithms (or a subset thereof) against a test write command 250, such as in a background process, according to the policy 275 (510). In certain embodiments, the compression module 260 then may weight the compression algorithms 278 according to attributes of the compression algorithms 278 and the policy 275 (520). The compression module 260 then may score the compression algorithms 278 to determine an optimal compression algorithm (530).

In certain embodiments, the test write block 250 will be compressed by the compression module 260 according to one or more of the compression algorithms 278. It should be understood that, in certain embodiments, a plurality of test write blocks 250 may be used to test the compression algorithms 278. In other embodiments, the test write block 250 may be one or more blocks 250 from the application 240 operating on the host 230 for writing to the data storage system 210. In a preferred embodiment, every block 250 from the host 230 may be compressed by all available compression algorithms 278. The compression algorithm 278 testing may be performed as a background operation in the data storage system 210 so operation (i.e., performance) of the data storage system 210 is not adversely affected by the additional overhead of compression algorithm 278 testing.

In certain embodiments, the compression module 260 may generate a score for test write block 250/compression algorithm 278 pair and the compression algorithm 278 having the highest score will be chosen. The score may be determined, in part, according to a policy 275. For example, the policy 275 may favor compression ratio, compression time efficiency, or a balance of compression ratio and compression time efficiency. Other policies may favor a current compression algorithm. For example, the compression module 260 may favor the current (first) compression algorithm over a second compression algorithm with a higher (highest) score so long as the lower score of the current compression algorithm is within a tolerance of the highest score.

Accordingly, as illustrated in FIG. 2, in a data storage system 210 in which compression ratio is preferred over compression time efficiency, for the test write 250, compression algorithm 1 is determined to have a compression ratio of 50%, compression algorithm 2 is determined to have a compression ratio of 58%, and compression algorithm N is determined to have a compression ratio of 29%. In certain embodiments, these compression ratios may be used as weights to, in part, generate scores for the compression algorithms. However, as illustrated in FIG. 2, although compression algorithm 1 has a lower compression ratio than that of compression algorithm 2, and therefore would be weighted lower and have a lower score, compression algorithm 1 is the current compression algorithm used in the data storage system 210 and, therefore, is favored over the second compression algorithm because it is within a tolerance (e.g., 10%) of the high score weighted according to the compression ratios.

Figure 3:
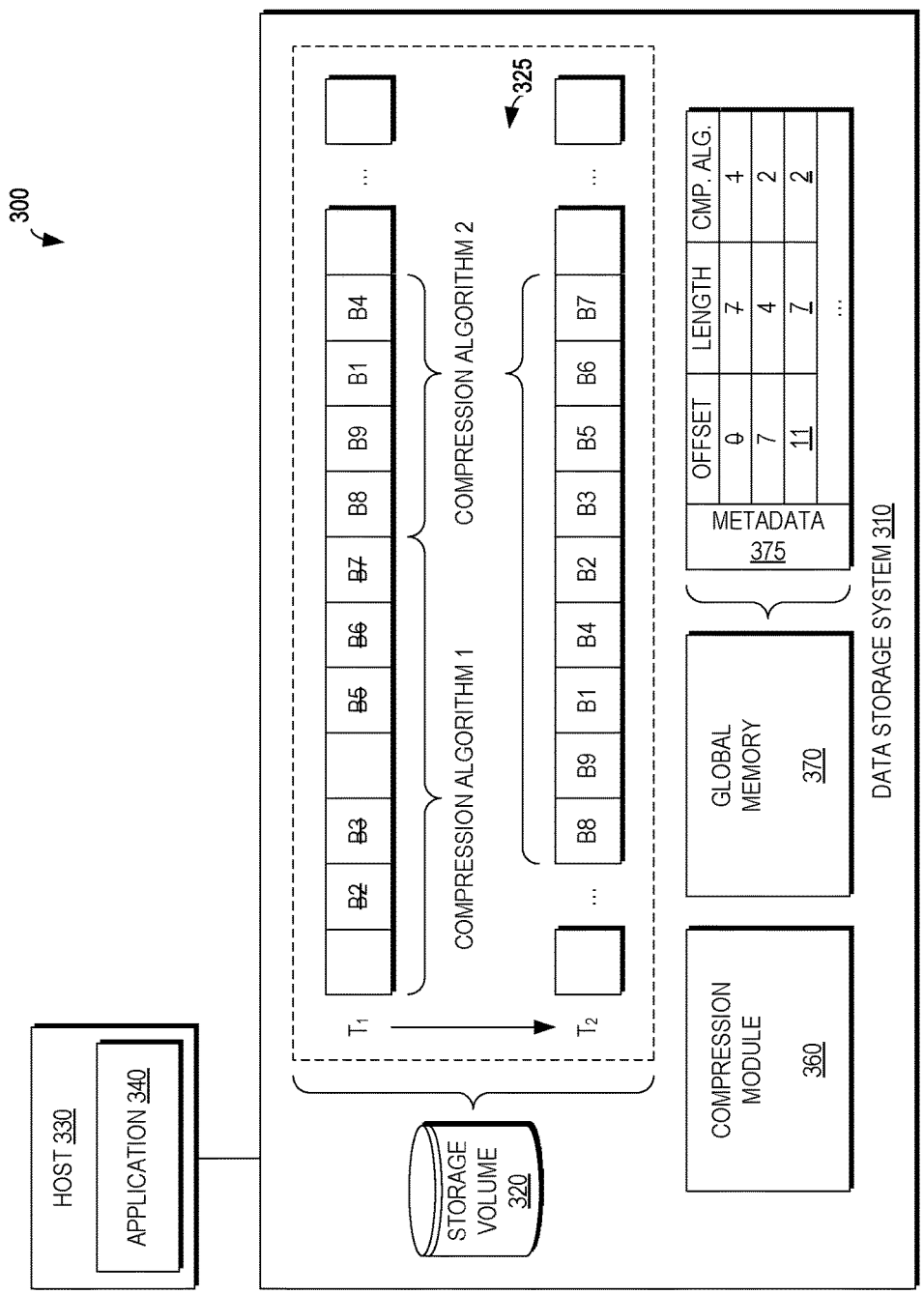
FIG. 3 is a block diagram illustrating a data cleanup in the system of FIG. 1 according to an example embodiment of the present invention.

FIG. 3 is a block diagram illustrating a data cleanup process in the data storage system of FIG. 1 according to an example embodiment of the present invention. FIGS. 6A-6C are flow diagrams illustrating methods for performing recompression (i.e., data cleanup) in the system of FIG. 1 according to an example embodiment of the present invention. FIGS. 3 and 6A-6C may be described in conjunction.

As illustrated in FIG. 3, at time $T_1$, there are ranges of old data stored according to the first compression algorithm and new data stored according to the second compression algorithm. These ranges may be stored in metadata 375. For example, at time $T_1$, offset 0 for a length of 7 is stored according to the first compression algorithm and offset 7 for a length of 4 is stored according to the second compression algorithm. In a preferred embodiment, such as an XtremIO all flash array, data is written sequentially rather than rewritten in the same location. Therefore, the data stored at time $T_1$ according to both the first compression algorithm and the second compression algorithm may be recompressed (i.e., cleaned up) at time $T_2$.

For example, as illustrated in FIG. 6A, the compression module 360 may determine that the writes to the storage volume 320 performed according to the first compression algorithm (i.e., B2, B3, B5, B6, and B7) at offset 0 for a length of 7 now should be stored in the data storage system 310 according to the second compression algorithm (610) (similar to the writes performed according to the second compression algorithm (i.e., B8, B9, B1, and B4) at offset 7 for a length of 4). Therefore, in a background process, the compression module 360 may recompress the data at offset 0 for a length of 7 according to the second compression algorithm (620) and store them at offset 11 for a length of 7.

As illustrated in FIG. 6B, the compression module 360 may read the data stored according to the first compression algorithm (630) and decompress the data according to the first compression algorithm (640). The compression module 360 then may compress the decompressed data according to the second compression algorithm (650) and write the data (660) sequentially (e.g., at offset 11 for a length of 7). A record of the offsets, ranges, and compression algorithms may be stored in metadata 375 in the global memory 370.

In certain embodiments, instead of performing recompression in a background process, the data storage system 310 may wait until a write command is received for the data stored according to the first compression algorithm (670) that the compression module 360 has determined should be stored according to the second compression algorithm (680). Thus, the compression module 360 may compress the write command according to the second compression algorithm on the block previously compressed according to the first compression algorithm (690).

Figure 7:
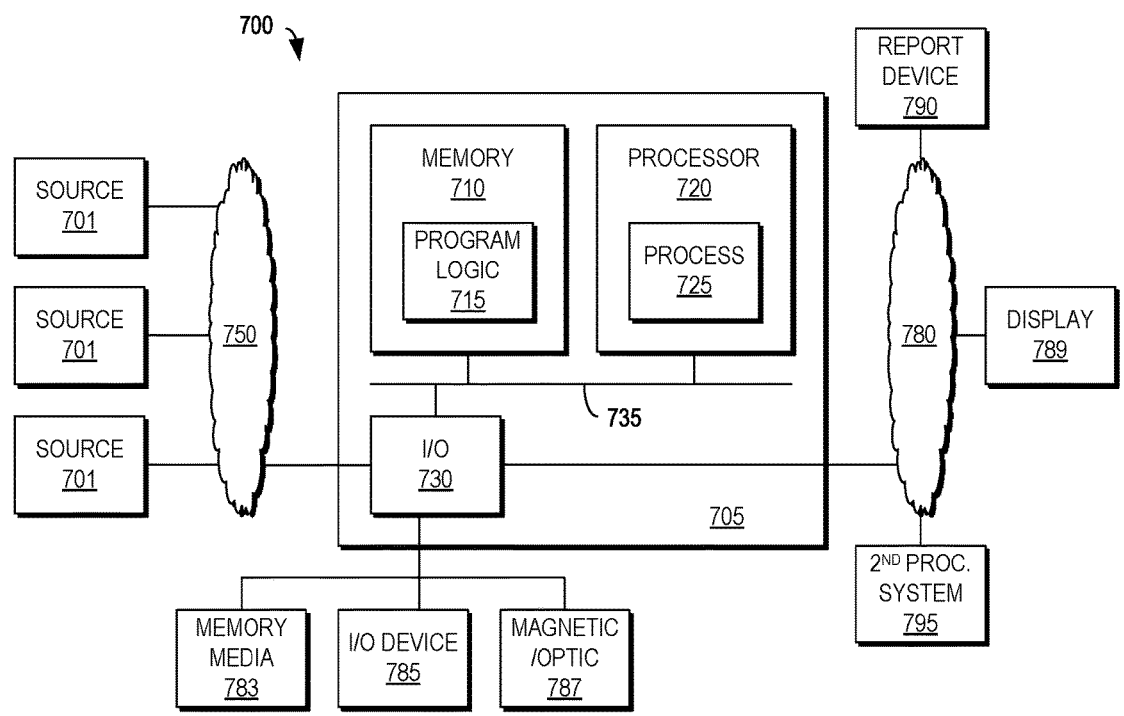
FIG. 7 is a block diagram illustrating an apparatus according to an example embodiment of the present invention.

FIG. 7 is a block diagram of an example embodiment apparatus 705 according to the present invention. The apparatus 705 may be part of a system 700 and includes memory 710 storing program logic 715, a processor 720 for executing a process 725, and a communications I/O interface 730, connected via a bus 735. The exemplary apparatus 705 is discussed only for illustrative purpose and should not be construed as a limitation on the embodiments or scope of the present disclosure. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

In some embodiments, the system may be performed by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be re-ordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

Figure 8:
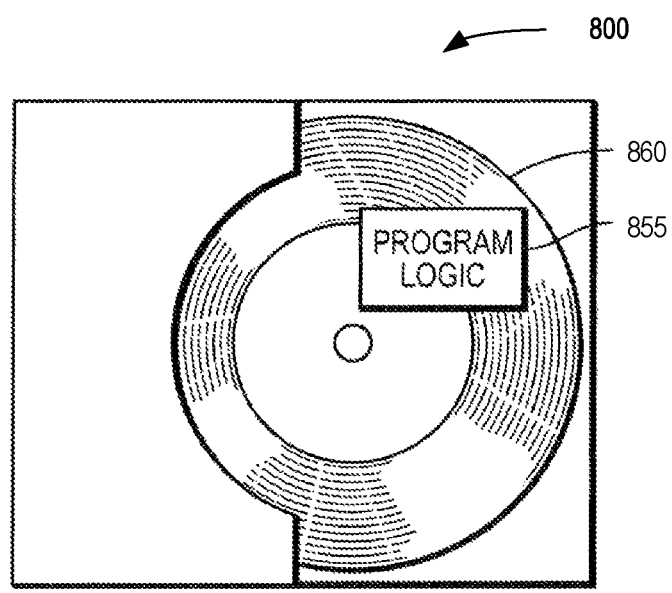
FIG. 8 is an illustrating of an example embodiment of the present invention as embodied in computer program code.

FIG. 8 is a block diagram of a computer program product 800 including program logic 855, encoded on a computer-readable medium 860 in computer-executable code configured for carrying out the methods of the invention, according to an example embodiment of the present invention. The logic for carrying out the method may be embodied as part of the aforementioned system, which is useful for carrying out a method described with reference to embodiments shown. In one embodiment, program logic 855 may be loaded into memory and executed by processor. In a further embodiment, program logic 855 may also be the same program logic 855 on a computer readable medium.

Various exemplary embodiments of the present disclosure have been described with reference to the accompanying drawings. It should be noted that all of these drawings and description are only presented as exemplary embodiments. It is to note that based on the subsequent description, alternative embodiments may be conceived that may have a structure and method disclosed as herein, and such alternative embodiments may be used without departing from the principle of the disclosure as claimed in the present disclosure.

It may be appreciated that these exemplary embodiments are provided only for enabling those skilled in the art to better understand and then further implement the present disclosure, not intended to limit the scope of the present disclosure in any manner. Besides, in the drawings, for a purpose of illustration, optional steps, modules, and units are illustrated in dotted-line blocks.

The terms "comprise(s)," "include(s)", their derivatives and like expressions used herein should be understood to be open, i.e., "comprising/including, but not limited to." The term "based on" means "at least in part based on." The term "one embodiment" means "at least one embodiment"; and the term "another embodiment" indicates "at least one further embodiment." Relevant definitions of other terms will be provided in the description below.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer-implemented method for storing data in a data storage system comprising:
  storing a plurality of compression algorithms;
  performing write commands in the data storage system according to a first compression algorithm;
  determining to perform write commands according to a second compression algorithm, wherein the determining to perform write commands according to the second compression algorithm comprises testing a plurality of compression algorithms against a test write command in a background process according to a policy, further wherein the policy includes a tolerance of a weighted score of a high score weighted according to a compression ratio, and the second compression algorithm is within the tolerance of the weighted score of the high score weighted according to a compression ratio; and performing write commands in the data storage system according to the second compression algorithm, wherein the performing write commands includes transitioning to perform write commands based on an application related to each write command.

2. The method of claim 1 further comprising maintaining data stored to the data storage system according to the first compression algorithm and the second compression algorithm such that the data storage system stores data contemporaneously according to the first compression algorithm and the second compression algorithm in sequence.

3. The method of claim 2 further comprising maintaining records identifying data stored according to the first compression algorithm and data stored according to the second compression algorithm.

4. The method of claim 3 wherein maintaining records identifying data stored according to the first compression algorithm and data stored according to the second compression algorithm comprises at least one of:
maintaining metadata in each block identifying its respective compression algorithm; and
maintaining records in a metadata cache of block range and compression algorithm pair.

5. The method of claim 2 wherein maintaining data stored to the data storage system according to the first compression algorithm and the second compression algorithm such that the data storage system stores data contemporaneously according to the first compression algorithm and the second compression algorithm comprises maintaining data stored to storage groups according to respective compression algorithms.

6. The method of claim 2 wherein the determining to perform the write commands according to a second compression algorithm is based on a respective storage group.

7. The method of claim 1
wherein determining to perform write commands according to a second compression algorithm comprises determining that a portion of the write commands performed according to the first compression algorithm should be stored to the data storage system according to the second compression algorithm; and
wherein performing write commands to the data storage system according to the second compression algorithm comprises, in a background process, recompressing according to the second compression algorithm the portion of the write commands originally stored to the data storage system according to the first compression algorithm.

8. The method of claim 1 further comprising receiving a write command for a block stored to the data storage system according to the first compression algorithm;
wherein determining to perform write commands according to a second compression algorithm comprises determining that the write command should be performed according to the second compression algorithm; and
wherein performing write commands to the data storage system according to the second compression algorithm comprises performing the write command according to the second compression algorithm on the block previously compressed according to the first compression algorithm.

9. The method of claim 1 wherein determining to perform write commands according to a second compression algorithm further comprises weighting the compression algorithms according to attributes of the compression algorithms and the policy.

10. A data storage system comprising:
a storage volume; and
memory storing computer program code that when executed on a processor causes the processor to execute a compression process operable to perform the operations of:
storing a plurality of compression algorithms;
performing write commands in the data storage system according to a first compression algorithm;
determining to perform write commands according to a second compression algorithm, wherein the determining to perform write commands according to the second compression algorithm comprises testing a plurality of compression algorithms against a test write command in a background process according to a policy, further wherein the policy includes a tolerance of a weighted score of a high score weighted according to a compression ratio, and the second compression algorithm is within the tolerance of the weighted score of the high score weighted according to the compression ratio; and
performing write commands in the data storage system according to the second compression algorithm, wherein the performing write commands includes transitioning to perform write commands based on an application related to each write command.

11. The system of claim 10 wherein the memory further stores computer program code operable to perform the operation of maintaining data stored to the data storage system according to the first compression algorithm and the second compression algorithm such that the data storage system stores data contemporaneously according to the first compression algorithm and the second compression algorithm in sequence.

12. The system of claim 11 wherein the memory further stores computer program code operable to perform the operation of maintaining records identifying data stored according to the first compression algorithm and data stored according to the second compression algorithm.

13. The system of claim 12 wherein computer program code operable to perform the operation of maintaining records identifying data stored according to the first compression algorithm and data stored according to the second compression algorithm comprises computer program code operable to perform at least one of the operations of:
maintaining metadata in each block identifying its respective compression algorithm; and
maintaining records in a metadata cache of block range and compression algorithm pairs.

14. The system of claim 11 wherein computer program code operable to perform the operation of maintaining data stored to the data storage system according to the first compression algorithm and the second compression algorithm such that the data storage system stores data contemporaneously according to the first compression algorithm and the second compression algorithm comprises computer program code operable to perform the operation of maintaining data stored to storage groups according to respective compression algorithms.

15. The system of claim 11 wherein the computer program code operable to the determining to perform the write commands according to a second compression algorithm is based on a respective storage group.

16. The system of claim 10
wherein computer program code operable to perform the operation of determining to perform write commands according to a second compression algorithm comprises computer program code operable to perform the operation of determining that a portion of the write commands performed according to the first compression algorithm should be stored to the data storage system according to the second compression algorithm; and
wherein computer program code operable to perform the operation of performing write commands to the data storage system according to the second compression algorithm comprises computer program code operable to perform the operation of, in a background process, recompressing according to the second compression algorithm the portion of the write commands originally stored to the data storage system according to the first compression algorithm.

17. The system of claim 10 wherein the memory further stores computer program code operable to perform the operations of receiving a write command for a block stored to the data storage system according to the first compression algorithm;
wherein computer program code operable to perform the operation of determining to perform write commands according to a second compression algorithm comprises computer program code operable to perform the operation of determining that the write command should be performed according to the second compression algorithm; and
wherein computer program code operable to perform the operation of performing write commands to the data storage system according to the second compression algorithm comprises computer program code operable to perform the operation of performing the write command according to the second compression algorithm on the block previously compressed according to the first compression algorithm.

18. The system of claim 10 wherein computer program code operable to perform the operation of determining to perform write commands according to a second compression algorithm further comprises computer program code operable to perform the operation of weighting the compression algorithms according to attributes of the compression algorithms and the policy.

19. A computer program product including a non-transitory computer readable storage medium having computer program code encoded thereon that when executed on a processor of a computer causes the computer to execute a compression process comprising:
computer program code for storing a plurality of compression algorithms;
computer program code for performing write commands in a data storage system according to a first compression algorithm;
computer program code for determining to perform write commands according to a second compression algorithm, wherein the determining to perform write commands according to the second compression algorithm comprises testing a plurality of compression algorithms against a test write command in a background process according to a policy, further wherein the policy includes a tolerance of a weighted score of a high score weighted according to a compression ratio, and the second compression algorithm is within the tolerance of the weighted score of the high score weighted according to the compression ratio; and
computer program code for performing write commands in the data storage system according to the second compression algorithm, wherein the performing write commands includes transitioning to perform write commands based on an application related to each write command.

* * * * *